United States Patent [19]
Tan et al.

[11] Patent Number: 5,514,769
[45] Date of Patent: May 7, 1996

[54] AROMATIC POLYAMIDES CONTAINING KETO-BENZOCYCLOBUTENE PENDANTS

[75] Inventors: Loon-Seng Tan, Centerville; Narayanan Venkatasubramaian, Fairborn, both of Ohio

[73] Assignee: The United States of America as represented by the Secretary of the Air Force, Washington, D.C.

[21] Appl. No.: 492,414

[22] Filed: Jun. 19, 1995

[51] Int. Cl.[6] ............................ C08G 69/00; C08G 73/12
[52] U.S. Cl. ........................ 528/322; 528/170; 528/183; 528/327; 528/373
[58] Field of Search ............................ 525/432; 528/373, 528/170, 322, 327, 183

[56] References Cited

U.S. PATENT DOCUMENTS

| | | | |
|---|---|---|---|
| 4,570,011 | 2/1986 | So | 560/8 |
| 4,711,964 | 12/1987 | Tan et al. | 548/461 |
| 4,719,283 | 1/1988 | Bartmann | 528/322 |
| 4,977,223 | 12/1990 | Arnold et al. | 525/432 |
| 5,095,075 | 3/1992 | Arnold et al. | 525/432 |
| 5,247,057 | 9/1993 | Tan et al. | 528/353 |
| 5,449,740 | 9/1995 | Tan et al. | 528/322 |

OTHER PUBLICATIONS

N. Venkatasubramanian and Loon–Seng Tan, "Thermosetting Matrix Polymers for Rigid–Rod Molecular Composites: Aromatic Polyamides Containing Keto–Benzocyclobutene Pendants", Polymer Preprints, vol. 35, No. 2, Aug. 1994, American Chemical Society, pp. 623–624. Publication Date: Jul. 5, 1994.

H. H. Chuah, L.–S. Tan and F. E. Arnold, "Bisbenzocyclobutene: A Thermoset Matrix Host for Rigid–Rod Molecular Composites", Polymer Engineering and Science, vol. 29, No. 2, Jan., 1989, pp. 107–112.

*Primary Examiner*—James J. Seidleck
*Assistant Examiner*—P. Hampton-Hightower
*Attorney, Agent, or Firm*—Charles E. Bricker; Thomas L. Kundert

[57] ABSTRACT

A crosslinkable polymer having repeating units of the formula:

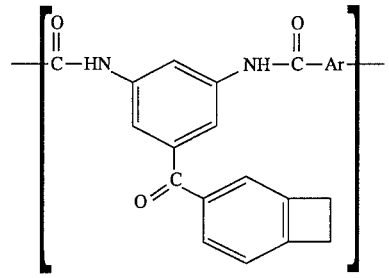

wherein Ar is selected from the group consisting of

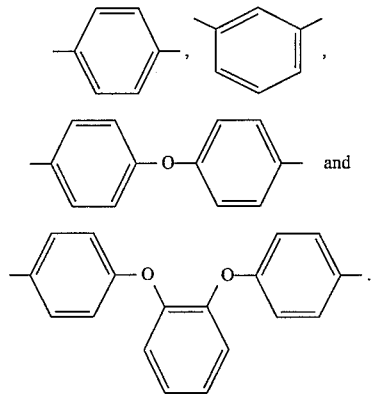

These polymers are useful in the preparation of molecular composites with rigid-rod polymers, including para-oriented benzobisazole polymers, such as benzobisthiazole, benzobisoxazole and benzobisimidazole polymers.

14 Claims, No Drawings

AROMATIC POLYAMIDES CONTAINING KETO-BENZOCYCLOBUTENE PENDANTS

RIGHTS OF THE GOVERNMENT

The invention described herein may be manufactured and used by or for the Government of the United States for all governmental purposes without the payment of any royalty.

BACKGROUND OF THE INVENTION

This invention relates to new aromatic polyamide compositions containing a crosslinkable benzocyclobutene group.

Benzocyclobutene (BCB)-based polymeric materials have recently attracted growing attention and research interest in the area of structural and electronic applications because of the versatile chemistry of benzocyclobutene as well as the combined advantages of processability and properties. The cure chemistry of benzocyclobutene is based upon the propensity of the four-membered ring to undergo electrocyclic ring-opening at elevated temperatures (~200° C.) to provide reactive o-quinodimethane that will undergo dimerization and polymerization, or react with an attendant dienophile to form a Diels-Alder adduct.

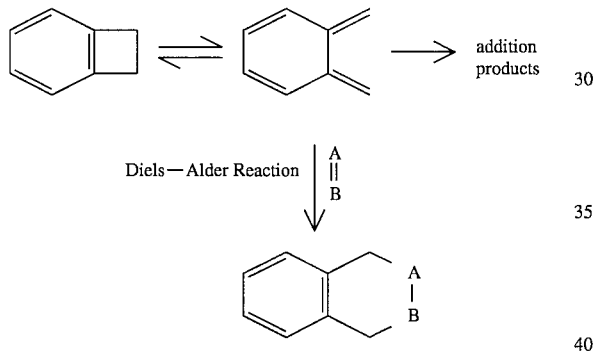

Research reports describing the synthesis and characterization of high-temperature BCB-based materials for potential structural and aerospace applications have already appeared. These heat-resistant thermosets, include, to name a few, homopolymerized bisbenzocyclobutene-terminated imide monomers and a variety of resins generated from Diels-Alder reactions of bisbenzocyclobutene-terminated imide monomers with monomers containing dienophilic end-groups such as acetylene, phenylacetylene and maleimide. Recently, the incorporation of the thermally reactive benzocyclobutene into the main chain of polymeric materials for lateral crosslinking has also been reported. The objective was to improve the compressive strength of high modulus fibers such as Kevlar® via the use of a latently crosslinkable monomer, 1,2-dihydrocyclobutabenzene 3,6-dicarboxylic acid An important area of investigation is the use of BCB-based thermoset matrix resins in the preparation of thermosetting rigid-rod molecular composites. The solubility of the BCB-imide oligomers in methanesulfonic acid (MSA), the stability of the BCB ring in the strongly acidic medium and its excellent thermo-oxidative stability make this matrix an ideal candidate for the molecular composite study. The molecular-level reinforcement of the network structure, derived from bisbenzocyclobutene-terminated imide oligomers, by poly(p-phenylene benzobisthiazole) (PBZT) was investigated by examining coagulated films extruded from MSA solutions. The results of the morphological studies showed that phase separation had occurred during coagulation. One possible explanation was that the BCB oligomeric system, being of low molecular weight, was unable to provide sufficient entanglement around PBZT to preclude the occurrence of phase separation.

Accordingly, it is an object of this invention to provide a high molecular-weight, BCB-containing polymer that can serve as the crosslinkable thermoplastic matrix host for PBZT.

Other objects and advantages of the present invention will be apparent to those skilled in the art.

SUMMARY OF THE INVENTION

In accordance with the present invention there is provided a polymer having repeating units of the formula:

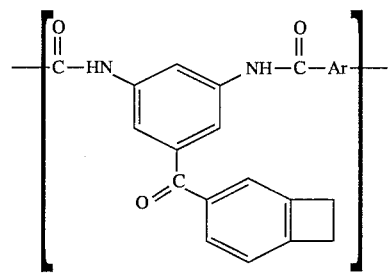

wherein Ar is selected from the group consisting of

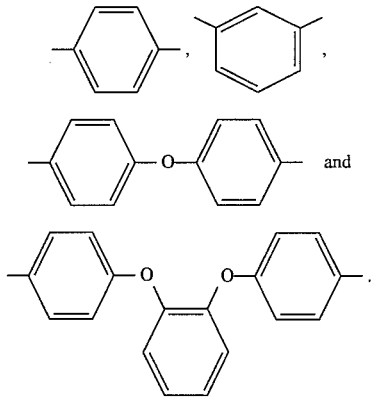

The polymer of this invention is prepared by the polymerization of 3,5-diaminophenyl-4-benzocyclobutenyl ketone with an aromatic diacid or diacid halide, as shown, for example, by the following reaction scheme:

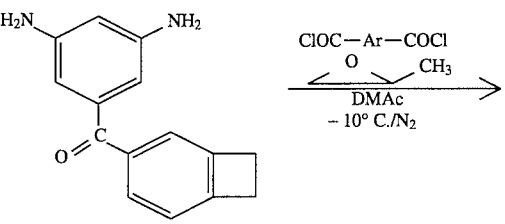

3

-continued

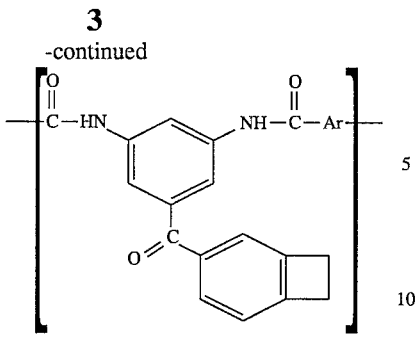

wherein Ar is as previously identified. The polymerization is conducted in a suitable aprotic solvent, such as dimethylacetamide (DMAC), at low temperatures using an acid scavenger, such as propylene oxide.

Preparation of the aromatic diamine monomer is disclosed in our co-pending application Ser. No. 08/492,152, filed of even date herewith. Briefly, the monomer is prepared as depicted in the following scheme:

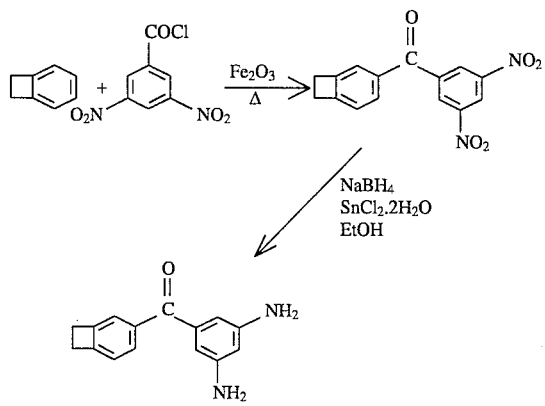

The polymers of the present invention can be crosslinked by the application of heat. As noted previously, these polymers exhibited broad cure exotherms with onset temperatures in the range of 238°–24° C., with maxima around 275°–276° C. Thus, the polymers can be crosslinked by heating to about 240°–280° C. for about 4 to 24 hours. These polymers are useful as crosslinkable, thermoplastic matrix materials for rigid-rod molecular composites. Such composites include, as perviously noted, composites with poly(p-phenylene benzobisthiazole) (PBZT), as well as with other para-oriented benzobisazole polymers, including other para-oriented benzobisthiazole polymers, para-oriented benzobisoxazole polymers, and para-oriented benzobisimidazole polymers. In these composites, the ratio, by weight, of matrix polymer to rigid-rod polymer can range from about 1:4 to about 10:1. Such composites may be employed as monolithic structures for a variety of applications, but particularly in high temperature environments.

The following examples illustrate the invention:

4

EXAMPLE I

Preparation of
Poly(imino(5-(bicyclo4.2.0)octa-1,3,5-trien-3-ylcarbonyl)-1,3-phenylene)iminocarbonyl-1,4-phenylenecarbonyl)

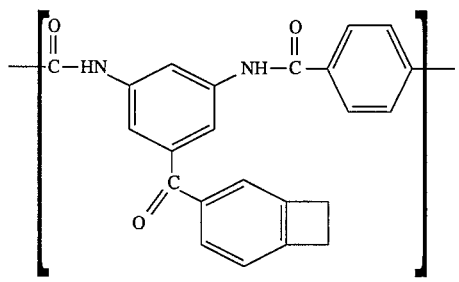

A solution of terephthaloyl chloride (0.9775 g, 4.81 mmol.) in anhydrous dimethylacetamide (DMAC) was added to a vigorously stirred solution of 3,5-diaminophenyl-4-benzocyclobutenyl ketone (1.1474 g, 4.81 mmol.) in DMAC at −10° C. under dry nitrogen conditions, the total initial concentration of the monomers being 10 wt %. The mixture was allowed to warm to room temperature and stirred overnight. The resulting viscous solution was diluted with 20 ml DMAC and the solution was stirred for a few more hours before adding excess (3 ml, 42.8 mmol.) propylene oxide at 0° C. The polymer was precipitated as a fibrous, off-white solid in 500 ml distilled water, filtered and dried (1.68 g, yield 95%) finally at 100° C. in vacuum. $\eta_{inh}$=0.61 dL/g (N,N'-dimethylacetamide, 30° C.). IR (KBr pellet, cm$^{-1}$): 3326 (amide NH), 3076 (CH, aromatic), 2934 (CH$_2$, benzocyclobutenyl), 1656 (keto and amide carbonyl, broad band), 1598, 1540 (aromatic C=C). Anal. Calc. for $C_{23}H_{16}N_2O_3$: C, 74.98; H, 4.38; N, 7.605. Found: C, 73.22; H, 4.38; N, 7.56.

EXAMPLE II

Synthesis of
Poly(imino(5-(bicyclo(4.2.0)octa-1,3,5-trien-3-ylcarbonyl)-1,3-phenylene)iminocarbonyl-1,3-phenylenecarbonyl)

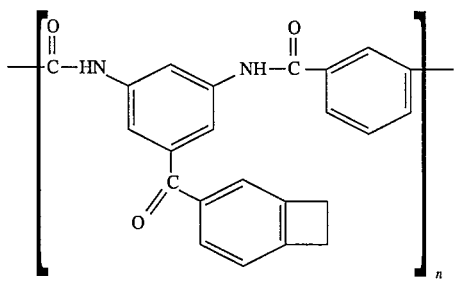

3,5-diaminophenyl-4-benzocyclobutenyl ketone (0.9292 g, 3.9 mmol.) was polymerized with isophthaloyl dichloride (0.7916 g, 3.9 mmol.) in presence of 2 ml (28.6 m.moles) of propylene oxide initially added as acid-acceptor and 15 ml anhydrous DMAC as solvent. The addition of the acid chloride was done at −20° C. and the reaction was run overnight at room temperature. The polyamide was precipitated from the viscous DMAC solution in 500 ml methanol as a stringy off-white solid. The polymer was washed several times with methanol after filtration and dried in vacuum at 100° C. (1.4 g, 98% yield). $\eta_{inh}$=0.30 dL/g (N,N'-dimethylacetamide, 30° C.). IR (KBr pellet, cm$^{-1}$): 3326 (amide NH), 3076 (CH, aromatic), 2934 (CH$_2$, benzocyclobutenyl), 1656 (keto and amide carbonyl, broad band), 1598, 1540 (aromatic C=C). Anal. Calc. for $C_{23}H_{16}N_2O_3$: C, 74.98; H, 4.38; N, 7.60. Found: C, 73.36; H, 4.38; N, 7.55.

EXAMPLE III

Preparation of
Poly(oxy-1,4-phenylenecarbonylimino(5-(bicyclo (4.2.0)octa-1,3,5-trien-3-ylcarbonyl)-1,3-phenylene)iminocarbonyl-1,4-phenylene)

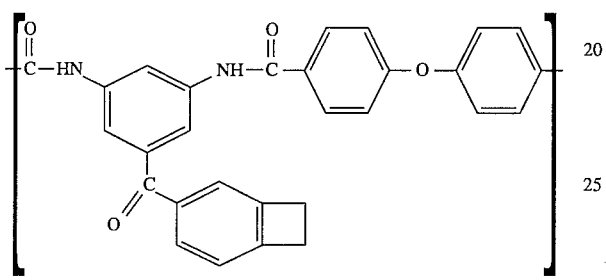

4,4'-oxydibenzoyl chloride (1.368 g, 4.600 mmol.) was added to 3,5-diaminophenyl-4-benzocyclobutenyl ketone (1.104 g, 4.600 mmol.) in anhydrous DMAC at –20° C., the initial concentration of the monomers being 20%. After stirring overnight at room temperature, excess propylene oxide (3 ml, 42.8 mmol.) was added to the the soft, gel-like polymer which was further diluted with DMAC. The polymer was worked up in a large excess of methanol and the fibrous material was Soxhlet extracted with methanol and finally dried in vacuum at 100° C. overnight. Yield of the off-white polymer was 2.05 g, 96%. $\eta_{inh}$=0.69 dL/g (N,N'-dimethylacetamide, 30° C.). Anal. Calc. for $C_{29}H_{20}N_2O_4$: C, 75.64; H, 4.38; N, 6.08. Found: C, 74.36; H, 4.24; N, 5.94. IR of the thin film cast from a 1 wt % solution of the polymer in DMAC showed the following bands (cm$^-$): 332 1 (NH), 3073 (aromatic CH), 2932 (cyclobutenyl CH$_2$), 1655 (keto and aide carbonyl), 1600, 1540 (aromatic C=C).

EXAMPLE IV

Preparation of 4,4'-(o-phenylenedioxy)dibenzoyl chloride 4,4'-(o-phenylenedioxy)dibenzonitrile was prepared from catechol (11.0 g., 0.100 mol.), 4-nitrobenzonitrile (32.56 g., 0.220 mol.), and anhydrous potassium carbonate (82.8 g., 0.600 mol.) in 300 mL of anhydrous dimethyl sulfoxide 80° C. for 20 h. It was obtained as white crystals, m.p. 117°–118° C., after recrystallization from isopropanol and heptane. IR spectrum ( KBr pellet, cm$^-$): 3100, 3065 (aromatic C-H), 2232 (C≡N), 1584, 1497 (aromatic C=C), 1270 (arylether).

4,4'-(o-phenylenedioxy)dibenzoic acid was prepared from the corresponding dinitrile using aqueous HBr and glacial acetic acid. The dinitrile (7.5 g., 0.024 mol.) was heated to reflux overnight in presence of 28 ml of a 48% aqueous solution of HBr (10 mol. excess) and 75 ml glacial acetic acid. The mixture was cooled in an ice-bath and the white precipitate was filtered off at the pump, washed several times with water and dried overnight. The white solid was finally dried in vacuum at 100° C. (7.1 g., yield 84%). The melting point was 257° C.–258° C. The —CN stretch at 2232 cm$^{-1}$ was totally absent in the IR spectrum (KBr pellet) which showed 3400-2500 cm$^{-1}$ (br., carboxylic acid OH), 3080 (aromatic CH), 1700 cm$^{-1}$ (C=O of the carboxylic acid), 1589, 1507 cm$^{-1}$ (aromatic C=C), 1270 cm$^{-1}$ (arylether).

4,4'-(o-phenylenedioxy)dibenzoyl chloride was prepared by the reaction of 7 grams of the diacid, 75 ml (a large excess) of thionyl chloride and a few drops of DMF under N$_2$. The reaction was left overnight under reflux and cooled. After distilling off thionyl chloride under nitrogen, the diacid chloride was recrystallized twice from dry hexane to yield 4.9 grams of white crystals (m.p., 99°–100° C.). IR spectrum (KBr pellet, cm$^{-1}$): 3106, 3070 (aromatic CH), 1764 (C=O of acid chloride), 1604, 1580, 1486 (aromatic ring), 1265 (arylether).

EXAMPLE V

Preparation of Poly(oxy-1,2-phenyleneoxy-1,4-phenylenecarbonylimino(5-(bicyclo(4.2.0)octa-1,3,5-trien-3-ylcarbonyl)-1,3-phenylene) iminocarbonyl-1,4-phenylene

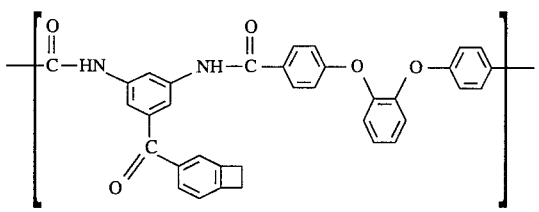

3,5-Diaminophenyl-4-benzocyclobutenyl ketone (1.0 10g, 4.240 mmol.) was reacted with equimolar amounts of 4,4'-(o-phenylenedioxy)dibenzoyl chloride (1.640 g., 4.240 mmol.) in 18 ml anhydrous DMAC under nitrogen. The initial temperature of the vigorously stirred reaction mixture was –12° C. The resulting light brown mixture was allowed to warm up on its own to the ambient temperature of 23° C. and stirred for 24 hours. The reaction mixture was cooled back to 0° C. and 3.5 ml propylene oxide (a large molar excess) was added. The solution was stirred at 0° C. for two hours and then poured into a large excess of methanol. The precipitated fibrous, off-white polymer was filtered and dried in vacuum at 100° C. (2.12 g, 92%). Anal. Calc. for $C_{35}H_{24}N_2O_5$: C, 76.06; H, 4.39; N, 5.07. Found: C, 74.56; H, 4.43; N, 5.18. The inherent viscosity of the polyamide in DMAC at 30° C. was 0.20 dl/g. This could not be cast into a film even from a 20 wt % solution in DMAC and only a translucent strip could be obtained after vacuum evaporation of the solvent at room temperature. IR (KBr pellet, cm$^{-1}$): 3345 (v. br., amide NH), 3072 (CH, aromatic), 2932 (CH$_2$, benzocyclobutenyl), 1656 (keto and amide carbonyl, broad band), 1605, 1543 (aromatic C=C).

EXAMPLE VI

Processing and Cure of BCB-pendanted polyamides

Tough, flexible, clear matrix films of poly(imino(5-(bicyclo(4.2.0)octa-1,3,5-trien-3-ylcarbonyl)-1,3-phenylene)iminocarbonyl-1,4phenylenecarbonyl) (Example I) and poly(oxy-1,4-phenylenecarbonylimino(5-(bicyclo(4.2.0)octa-1,3,5-trien-3-ylcarbonyl)-1,3-phenylene)iminocarbonyl-1,4-phenylene) (Example III) for the evaluation of mechanical properties (tensile strength and tensile modulus) were typically obtained from 5% solutions of the polymers in DMAC (0.1 g polymer in 2 ml DMAC) by stripping off the solvent from the casting dish in a vacuum desiccator using 0.3 mm Hg vacuum at room temperature. Addition of distilled water to the casting dish facilitated the removal of the film from the dish. The films were dried at 100° C. in vacuum overnight prior to measuring mechanical properties. The curing of the films was done under dry argon or nitrogen in a vacuum oven at 250° C. for 24 hours. Typical mechanical properties as exemplified by the polyamide of Example III: (before cure) tensile strength, 12.1–12.8 Ksi; tensile modulus, 0.39–0.45 Msi; elongation to break, 2.9–7.3%; (after cure) tensile strength, 12.2–13.3 Ksi; tensile modulus, 0.46–0.67 Msi; elongation to break, 1.5–2.5%.

EXAMPLE VII

Stability of Benzocyclobutene-pendanted Polyamides in Methanesulfonic Acid

Dissolution and regeneration of poly(imino(5-(bicyclo(4.2.0)octa-1,3,5-trien-3-ylcarbonyl)-1,3-phenylene)iminocarbonyl-1,4-phenylenecarbonyl) (Example I) from methanesulfonic acid were conducted in order to assess the stability of the matrix polymer, especially that of the benzocyclobutene ring in the strongly acidic medium. 0.25 gm of the polymer was mixed with 15 ml distilled methanesulfonic acid (1.1 wt concentration) and stirred. A yellow colored solution of the polymer was obtained in MSA after two hours. The solution was stirred at room temperature, and after a total time of 20 hours, the polymer was reprecipitated by pouring the polymer solution into a large volume of distilled water. The residual MSA in the regenerated polymer was soxhlet extracted with water and the solid was dried in vacuum at 100° C. for 24 hours. Examination of the recovered polymer by infrared spectroscopy, differential scanning calorimetry and thermogravimetry analysis indicated the same polymer was recovered quantitatively.

EXAMPLE VIII

Preparation of composite film

The preparation of a 50/50 (by weight) of a poly{(benzo-(1,2-d;4,5-d')bisthiazole-2,6-diyl)-1,4-phenylene} (PBZT) and poly(imino(5-(bicyclo(4.2.0)octa-1,3,5-trien-3-ylcarbonyl)-1,3-phenylene)iminocarbonyl-1,4-phenylenecarbonyl) (Example I) blend was carried out by initially dissolving 0.25 g PBZT in 15 ml distilled methanesulfonic acid (MSA) overnight. To the vigorously stirred MSA solution of PBZT was added 0.25 g of the polyamide and the dissolution of the latter was complete in a few hours. The concentration in MSA solution for each polymer was 1.1 wt %. The greenish yellow colored solution was deaerated under vacuum and films were cast by doctor-blading the solution inside a nitrogen-swept glove-bag. The films were instantly immersed in a large volume of cold water (35° F.–40° .F) for coagulation. The more transparent among the films were then dried, first in air and then at 100° C. in vacuum. Examination of the films under a scanning electron microscope showed the presence of PBZT domains suggesting phase separation during coagulation process. However, the domain size did not increase after the composite films had been cured (250° C., flowing nitrogen atmosphere, 24 hours).

EXAMPLE IX

Thermal/Thermo-oxidative Properties and Acid Stability

All the polymers exhibited broad BCB cure exotherms with onset temperatures in the range 238°–241° C., maxima around 275°–276° C., and tailing to 350° C. temperature range. The Tg's of the polymers could not be detected in the DSC before and after the curing of the polymers. Presumably, the initial Tg's of the pristine polyamide fell within the temperature regime (200°–350° C.) where the crosslinking of the polymer through the o-quinodimethane intermediate arising from BCB ring-opening took place.

When the TGA scans of the polymers were run in air, there was, in all cases, an oxidative weight gain of nearly 2% between 220°–330° C. in air prior to the thermal degradation of the polymers. It appeared that some thermally-induced oxidation reaction was occurring at the BCB sites. This is supported by the appearance of a shoulder (~226° C.) in the characteristically broad exotherm ascribable to the ring-opening of the BCB moiety when the DSC was conducted in air. However, the model compound did not exhibit any oxidative weight increase in air. The contrasting thermo-oxidative susceptibility of the BCB-pendanted polyamide can be attributed to the oxidation of the reactive diene from the ring-opened BCB above 200° C., competing with the crosslinking process via the addition reaction of two BCB pendant units, whose encounter was apparently being slowed somewhat by the bulk of the main polymeric chain. In the case of small molecules, the BCB mobility was relatively unhampered for reaction with another reactive BCB unit under thermal activation.

A thin, transparent, and colorless film of the BCB-pendanted polyamide of Example III, (cast from a 1% polymer solution in DMAC ) was heat-treated in nitrogen for a few hours at 240° C.–250° C. The only changes detectable in the IR spectrum were in the benzocyclobutenyl $CH_2$ stretching frequency at 2932 $cm^{-1}$, whose intensity was noticeably lowered in the spectrum of the cured sample. The cured film was yellow and insoluble in DMAC, which merely swelled the polymer film after several hours of immersion.

BCB-pendanted polyamide from Example I was completely dissolved in methanesulfonic acid. The resultant solution was stirred for 20 hrs prior to precipitating the polymer in water. The facts that the enthalpy of the characteristic reaction exotherm of the regenerated polyamide remained practically unchanged, and its IR spectrum was identical to that of the original polymer firmly suggested the stability of the BCB ring as well as the polymer backbone in MSA at room temperature for a prolonged period of time.

Various modifications may be made in the instant invention without departing from the spirit and scope of the appended claims.

We claim:

1. A polymer having repeating units of the formula:

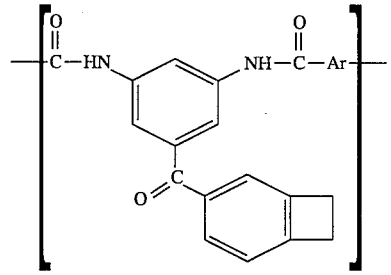

wherein Ar is selected from the group consisting of

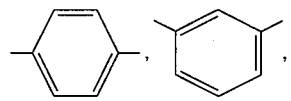

-continued

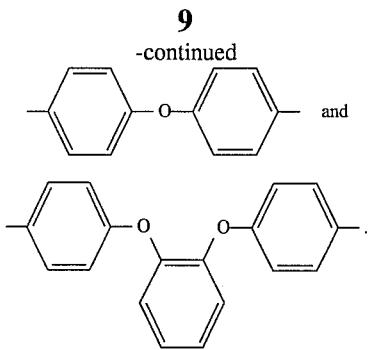
and

2. The polymer of claim 1 wherein said Ar is

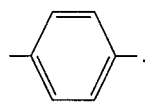

3. The polymer of claim 1 wherein said Ar is

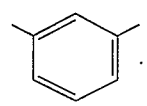

4. The polymer of claim 1 wherein said Ar is

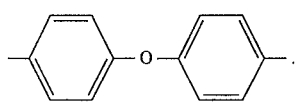

5. The polymer of claim 1 wherein said Ar is

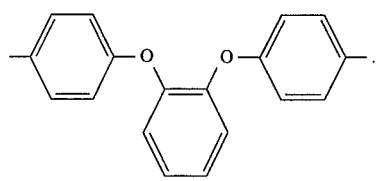

6. A molecular composite system consisting essentially of a para-oriented benzobisazole polymer and a crosslinkable matrix polymer having repeating units of the formula:

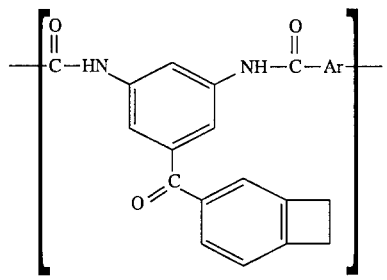

wherein Ar is selected from the group consisting of

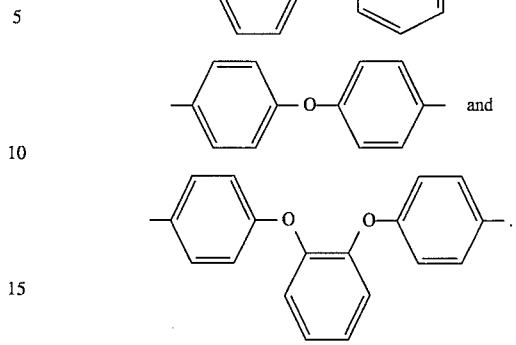

7. The molecular composite system of claim 6 wherein the weight ratio of said crosslinkable polymer to said rigid-rod polymer is about 1:4 to 10:1.

8. The molecular composite system of claim 6 wherein said benzobisazole polymer is a benzobisthiazole polymer.

9. The molecular composite system of claim 6 wherein said benzobisazole polymer is a benzobisoxazole polymer.

10. The molecular composite system of claim 6 wherein said benzobisazole polymer is a benzobisimidazole polymer.

11. The molecular composite system of claim 6 wherein said Ar in said matrix polymer is

12. The molecular composite system of claim 6 wherein said Ar in said matrix polymer is

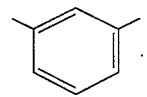

13. The molecular composite system of claim 6 wherein said Ar in said matrix polymer is

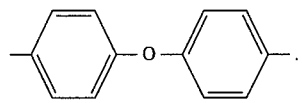

14. The molecular composite system of claim 6 wherein said Ar in said matrix polymer is

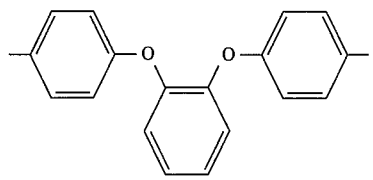

* * * * *

UNITED STATES PATENT AND TRADEMARK OFFICE
CERTIFICATE OF CORRECTION

PATENT NO. : 5,514,769

DATED : May 7, 1996

INVENTOR(S) : Loon-Seng Tan et al

It is certified that error appears in the above-indentified patent and that said Letters Patent is hereby corrected as shown below:

Column 3, line 44, "238°-24°C" should read ---238°-241°C---.

Column 5, line 44, "(cm-)" should read ---(cm$^{-1}$)---.

Column 5, line 44, "332 1" should read ---3321---.

Column 5, line 46, "aide" should read ---amide---.

Column 5, line 58, "(cm-)" should read ---(cm$^{-1}$)---.

Column 6, lines 34-35, "1.010g" should not be divided.

Signed and Sealed this

First Day of April, 1997

Attest:

Attesting Officer

BRUCE LEHMAN

Commissioner of Patents and Trademarks